United States Patent
Greaves et al.

(10) Patent No.: US 6,185,688 B1
(45) Date of Patent: Feb. 6, 2001

(54) METHOD FOR CONTROLLING SECURITY OF A COMPUTER REMOVABLY COUPLED IN A NETWORK

(75) Inventors: Thomas W. Greaves, Palo Alto; Richard A. Milewski, Sunnyvale, both of CA (US); Fred B. Schade, Highland, UT (US)

(73) Assignee: NetSchools Corporation, Santa Clara, CA (US)

( * ) Notice: Under 35 U.S.C. 154(b), the term of this patent shall be extended for 0 days.

(21) Appl. No.: 09/044,511

(22) Filed: Mar. 18, 1998

(51) Int. Cl.[7] ............................. G06F 11/00; G06F 12/36
(52) U.S. Cl. ..................... 713/201; 713/200; 709/203; 709/204; 709/205; 709/208; 709/209; 709/227; 709/228; 345/504; 434/350; 434/365
(58) Field of Search ..................... 713/200, 201; 709/204, 205, 227, 208, 209, 228, 203; 345/504; 434/350, 365

(56) References Cited

U.S. PATENT DOCUMENTS

| | | | |
|---|---|---|---|
| 5,117,430 | * 5/1992 | Berglund ........................... | 370/408 |
| 5,483,658 | * 1/1996 | Grube et al. ..................... | 713/200 |
| 5,720,035 | * 2/1998 | Allegre et al. ................... | 709/225 |
| 5,724,530 | * 3/1998 | Stein et al. ...................... | 345/329 |
| 5,784,464 | * 7/1998 | Akiyama et al. ................. | 380/25 |
| 5,823,788 | * 10/1998 | Lemelson et al. . | |

* cited by examiner

Primary Examiner—Ayaz R. Sheikh
Assistant Examiner—Rupal D. Dharia
(74) Attorney, Agent, or Firm—Townsend and Townsend and Crew; Kenneth R. Allen

(57) ABSTRACT

A method for controlling physical security of a computer removably coupled to a network wherein a security administrator associated with a server invokes a timer in a client computer and disables the client computer if the computer is not operated within the network with a frequency preset by the security administrator. Techniques are provided in the client computer to inhibit breach of the security of the timer.

4 Claims, 2 Drawing Sheets

METHOD FOR CONTROLLING SECURITY OF A COMPUTER REMOVABLY COUPLED IN A NETWORK

BACKGROUND OF THE INVENTION

This invention relates to security of computers on a network, including for example a wireless network of portable computers in a classroom environment, a wired local area network, a cable television system with settop boxes containing computing devices, a telephone system, either wireless or wired, having computer controlled devices coupled thereto, such as cellular telephones, computers and the like, and a satellite-based network.

One of the security concerns of valuable property, such as a computer, is theft. A network can be used to enhance security and prevent theft of the property, especially if the property has sufficient intelligence to participate in its own security without the knowledge of the thief.

SUMMARY OF THE INVENTION

In a network, a method is provided for controlling physical security of a computer removably coupled to a network. According to the invention, a security administrator associated with a server invokes a timer in a client computer and disables the client computer if the computer is not operated within the network within a time period preset by the security administrator. Techniques are provided in the client computer to inhibit breach of the security of the timer.

The invention will be better understood by reference to the following detailed description in connection with the accompanying drawings.

DESCRIPTION OF SPECIFIC EMBODIMENTS

Figure 1:
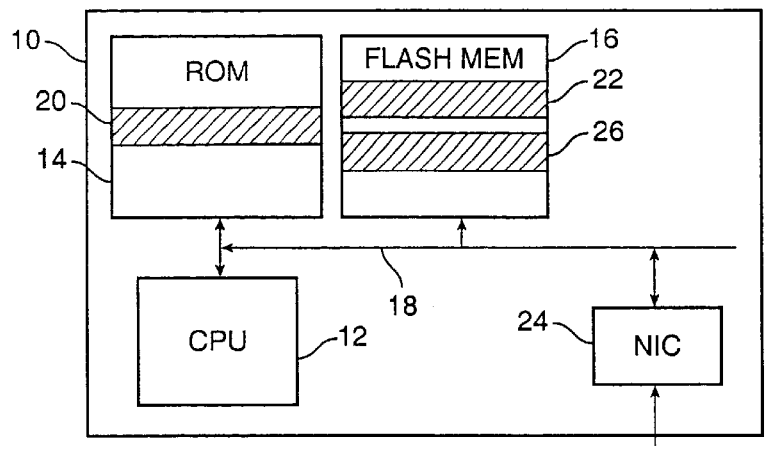
FIG. 1 is a block diagram of a network having secured computers.

Referring to FIG. 1, there is shown a block diagram of a portable computer 10 having a central processor 12 to which is coupled an indelible memory element 14, such as a Read Only Memory, and a rewritable non-volatile memory element, such as a flash memory 16 addressable from the central processor via a bus 18. Within a memory space of the ROM 14 is a timer program 20. The timer program 20 tracks current date, timeout date and certain safety boundary parameters which require frequent update to guard against tampering. The variables are stored in memory locations 22 of the flash memory 16 and are writable only by means of a special BIOS call command secured by the nonvolatile portion of the BIOS. The computer 10 further includes a network interface component (NIC) 24 which provides a port through which time updates can be written to a time register 26 in the flash memory. It is contemplated that the timer update procedure uses some form of encryption and password protection to inhibit tampering with the timer via the NIC 24 or any other timer registers. With this structure, the timer 20, which is a nonmodifiable program which works in conjunction with restricted access nonvolatile registers, can effectively inhibit unauthorized use of the computer outside of an authorized (home) network environment.

Figure 2:
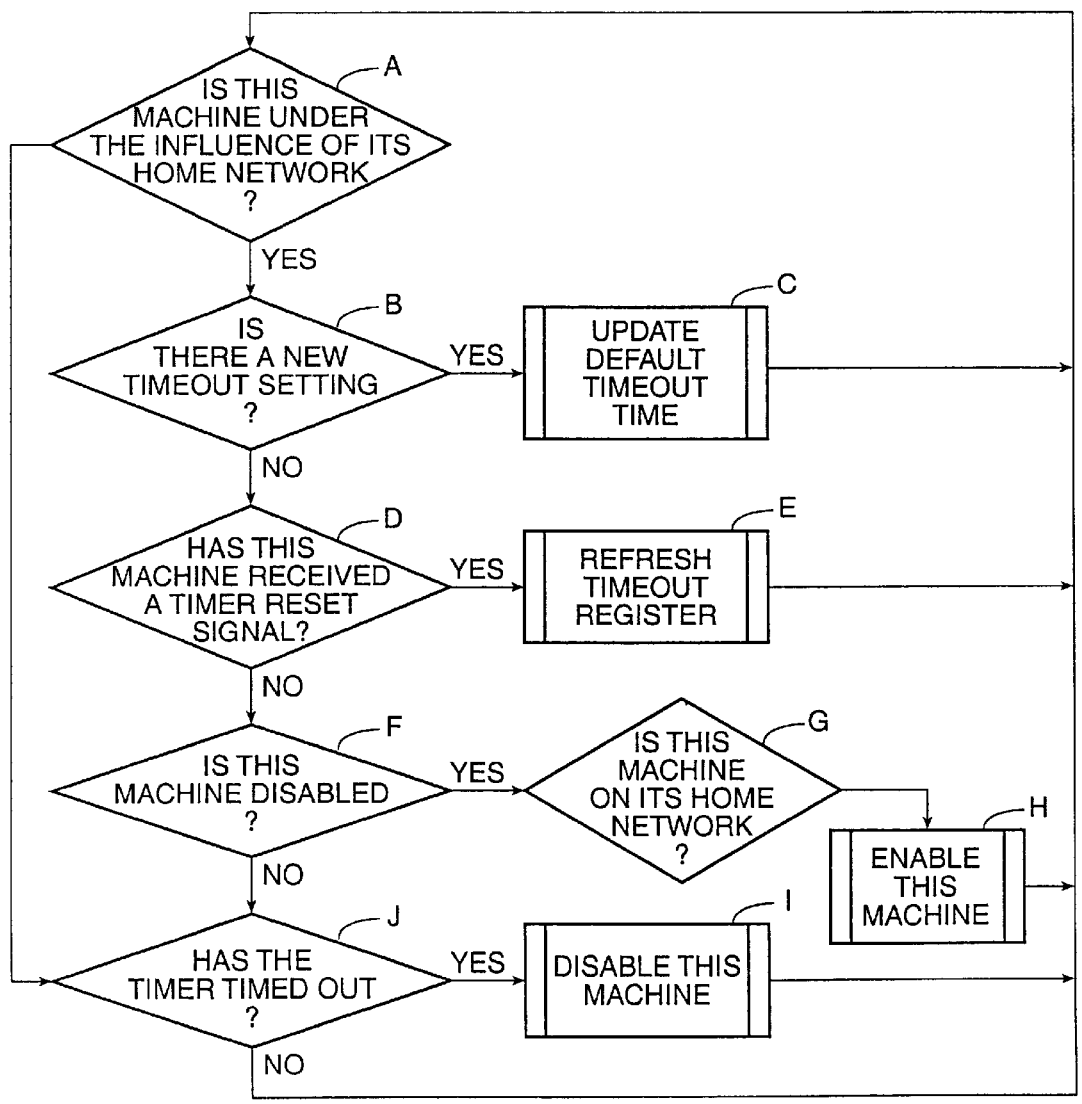
FIG. 2 is a flow chart according to the method of the invention.

Referring to FIG. 2, there is shown a flow chart of the method according to the invention in a timer program 20. The first test is to determine whether the present device is under the influence of its own or home network (Step A). If it is, then it tests for a new timeout setting, i.e., the drop dead date (Step B). This can be done by comparing a prestored timeout setting and a current timeout setting. If there is a new timeout setting, the default timeout time (date) is updated (Step C), and the process is restarted.

If there is no new timeout setting, the local machine tests to determine whether it has received a timer reset signal (Step D). If yes, the timeout signal is reset (Step E) and the process is restarted.

If no timeout signal has been received, the machine tests to see if it is at least partly disabled (Step F). If yes, it tests whether it is on its home network (Step G) (for example by an attempted handshake and mutual identification) and if successful, the machine is enabled (Step H) and the process is restarted.

If the machine is not on the home network, the machine forces a self-disable (Step I). Similarly, if the machine is not disabled, but it times out based on the time (Step J), it disables itself (Step I) and restarts the process (Step A).

All this presupposes that the process is carried out in a slave computer wherein an indelible program writes under some restricted access to a nonvolatile region of a memory device, with the ability to override selected key operations of a computer system if the timer parameters are violated.

There are a number of measures which enhance the security of the client or slave computer. First, the serial number, which is the basis of the identification of the computer, is embedded in indelible Read Only Memory (ROM). Second, the timer function is embedded in unmodifiable ROM and the time values are stored in flash ROM. Third, a parameter daemon monitor function is provided in unmodifiable BIOS ROM to check for modification of the timer beyond preset parameters, typically within a few hundred seconds. Fourth, the BIOS is password protected, the password being in the possession of the system administrative personnel. Fifth, BIOS features can only be changed via secured network communication and not via keyboard input. Encrypted messages are typically used to communicate such messages.

Figure 3:
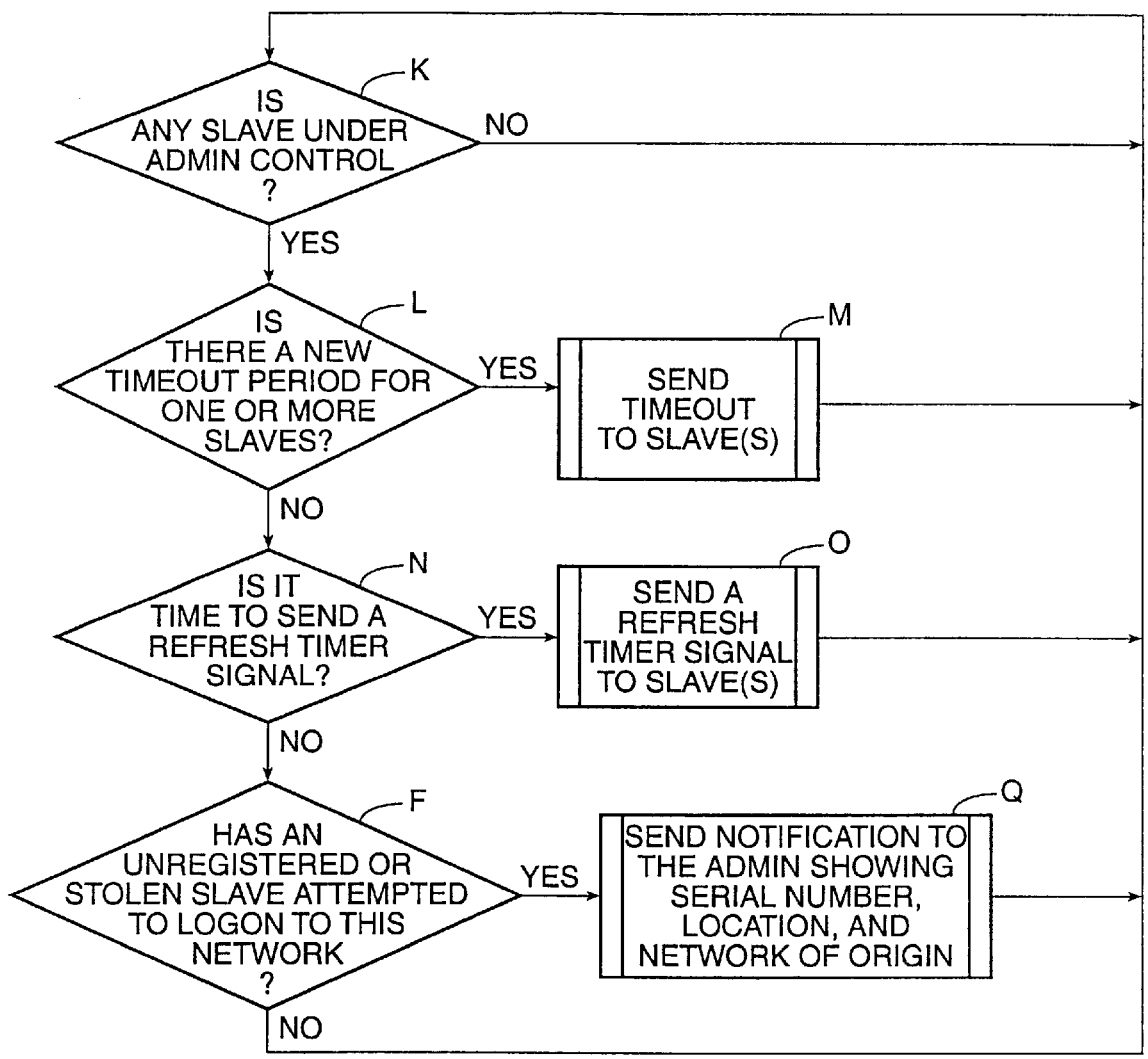
FIG. 3 is a flow chart according to a further method of the invention.

Referring to FIG. 3, a system administrator, namely a module of a server containing a database of associated client computers, after determining whether there are any slave computers under its administrative control (Step K) and reads from a user input to test for a need for a new timeout period (Step L) sets a timeout period for each client computer and sends it to the respective slaves (Step M). At appropriate intervals, such as once an hour, or upon logout, if this is a two-way system (step N), the administrator issues a reset timer signal to the networked client computer (Step O). There is a default time of for example twenty-one days (1,310,400 seconds). (The client computer sets and keeps its secure internal timer to zero whenever it is receiving signals from the authorized network (Step E, FIG. 2)).

In a particular embodiment, wherein there is two-way communication available at some level of functionality, such as in a two-way LAN, whenever a client computer attempts to connect to a network other than to its authorized network, the security administrator is alerted (Step P), the security administrator collects the identification of the invading client computer and its home network and sends a notification message to the security administrator of the home network (Step Q). (This protocol presupposes that the client computer includes in its reporting identification its own hard-wired serial number and that a central database or a distributed database exists which ties computer identification with home network registration.)

The invention has been explained with reference to specific embodiments. Other embodiments will be apparent to those of ordinary skill in the art. It is therefor not intended to be limited, except as indicated by the appended claims.

What is claimed is:

1. A method for controlling physical security of a slave device in a network having an administrator device and a slave device having an embedded timer, said method comprising the steps, in said slave, of:

sensing whether said slave device is present within an authorized network; thereupon allowing operation of said slave device for a designated period delimited by a timeout of said timer;

only upon receipt of a timer reset signal from an authorized administrator device of said authorized network by said slave device, resetting a timer register of said timer to allow continued operation of said slave device; otherwise causing said slave device to disable itself such that the slave device is rendered nonfunctional absent further authorized external intervention.

2. The method of claim 1 wherein said timeout is effected after said resetting whether or not said slave device is coupled to said authorized network, such that said slave device is rendered operationally unusable.

3. The method of claim 2 wherein said resetting of said slave device is effected by any authorized administrative device.

4. The method according to claim 2 wherein said slave device upon timeout is placed in a reconnect wait state.

* * * * *